(12) United States Patent
Okamoto et al.

(10) Patent No.: US 7,408,692 B2
(45) Date of Patent: Aug. 5, 2008

(54) PROCESS FOR PRODUCING THREE-DIMENSIONAL STRUCTURE

(75) Inventors: Kohei Okamoto, Menlo Park, CA (US); Koji Yano, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/573,308

(22) PCT Filed: Sep. 30, 2004

(86) PCT No.: PCT/JP2004/014809

§ 371 (c)(1),
(2), (4) Date: Aug. 9, 2006

(87) PCT Pub. No.: WO2005/033756

PCT Pub. Date: Apr. 14, 2005

(65) Prior Publication Data

US 2006/0291035 A1 Dec. 28, 2006

(30) Foreign Application Priority Data

Oct. 2, 2003 (JP) ............................. 2003-344412

(51) Int. Cl.
*G02F 1/01* (2006.01)
*A61N 5/00* (2006.01)
(52) U.S. Cl. .................... 359/241; 359/619; 250/492.1
(58) Field of Classification Search ................ 359/240, 359/241, 245, 237, 321, 322, 619; 250/492.1, 250/214 VT, 271, 569; 372/14, 17, 19, 25, 372/50, 77, 98, 99, 103; 385/11, 33, 124, 385/129; 219/121.11, 121.61, 121.73, 121.69, 219/121.8; 313/385, 388, 527, 529; 378/145
See application file for complete search history.

(56) References Cited

U.S. PATENT DOCUMENTS 3,286,193 A * 11/1966 Koester et al. ............... 372/14

(Continued)

FOREIGN PATENT DOCUMENTS

EP 1 089 095 A2 4/2001

(Continued)

OTHER PUBLICATIONS

Satoru Shoji et al., "Photofabrication of a Photonic Crystal Using Interference of UV Laser," *Proceedings of the SPIE*, vol. 3470, pp. 514-544 (Jun. 1999).

(Continued)

*Primary Examiner*—Loha Ben
(74) *Attorney, Agent, or Firm*—Fitzpatrick, Cella, Harper & Scinto

(57) ABSTRACT

A process for producing a periodic structure comprises the steps of preparing a working object, the property of which changes in view of a photoreaction caused by an exciting energy, generating a light having a photonic energy of intensity of one fraction of natural number divisions of the exciting energy by each of the light sources of light-source groups arranged regularly in a two-dimensional arrangement, and concentrating the light emitted from the light source group at each of the light-concentrating points arranged at regular intervals in the working object to cause a photoreaction at and around the light-concentrating point to form a periodic structure comprised of regions each of which has a changed property in the working object.

9 Claims, 7 Drawing Sheets

U.S. PATENT DOCUMENTS

| | | | | |
|---|---|---|---|---|
| 3,482,104 | A | * 12/1969 | Finkle | 250/214 VT |
| 6,456,416 | B1 | 9/2002 | Ichimura et al. | 359/241 |
| 2002/0070352 | A1 | 6/2002 | Allan et al. | 250/492.1 |
| 2004/0027675 | A1 | 2/2004 | Wu et al. | 359/619 |

FOREIGN PATENT DOCUMENTS

| | | |
|---|---|---|
| WO | WO 02/084340 A1 | 10/2002 |

OTHER PUBLICATIONS

Mike Hutley et al., "Microlens Array," *Physics World*, pp. 27-32 (Jul. 1991).

Dongmin Wu et al., "Fabrication and Characterization of THz Plasmonic Filter," *Proceedings of the 2002 2$^{nd}$ IEEE Conference on Nanotechnology*, pp. 229-231 (Aug. 2002).

Hong-Bun Sun et al., "Three-Dimensional Photonic Crystal Structures Achieved with Two-Photon-Absorption Photopolymerization of Resin," 74(6) *Appl. Phys. Lett.* 786-88 (Feb. 1999).

N. Kawai et al., "Confined Band Gap in an Air-Bridge Type of Two-Dimensional AlGaAs Photonic Crystal," 86(11) *Physical Rev. Lett.* 2289-92 (Mar. 2001).

M. Notomi et al., "Drilled Alternating-Layer Three-Dimensional Photonic Crystals Having a Full Photonic Band Gap," 77(26) *Appl. Phys. Lett.* 4256-58 (Dec. 2000).

Yurii A. Vlasov et al., "On-Chip Natural Assembly of Silicon Photonic Bandgap Crystals," 414 *Nature* 289-93 (Nov. 2001).

* cited by examiner

PROCESS FOR PRODUCING THREE-DIMENSIONAL STRUCTURE

TECHNICAL FIELD

The present invention relates to a process for producing a three-dimensional structure, in particular to a process for producing a three-dimensional photonic crystal.

BACKGROUND ART

Recently, fine processing techniques and fine processing apparatuses have been developed for processing at a level that is finer than the visible light wavelength, such as those in semiconductor processing techniques. Further, techniques and apparatuses for working of optical elements having a structure on a light wavelength level have been developed, such as photonic crystals different from electronic elements. In particular, in the field of optical elements, a process for producing a two-dimensional air-bridge type photonic crystal is disclosed, which process employs electron-beam lithography and reactive-ion-beam etching (Physical Review Letters, vol. 86, No. 11, p. 2289). Further, a process for producing a three-dimensional photonic crystal is disclosed, in which the three-dimensional photonic crystal is produced by laminating different substances alternately by auto-cloning on a two-dimensional periodic structure formed on a substrate (Applied Physics Letter, vol. 77, No. 26, p. 4256). Further, a process for producing a three-dimensional photonic crystal is disclosed, in which fine Si spheres are arranged in a solvent (Nature, vol. 414, p. 289).

Although structures having a desired two-dimensional configuration can be produced by a semiconductor processing technique, the processing in the height direction is conducted by a lamination technique, so that a three-dimensional fine periodic structure cannot readily be produced. Further, in the aforementioned process of lamination of different substances on a two-dimensional periodic structure formed on a substrate, there are difficulties associated with the necessity to maintain strict cleanliness and flatness of the substrate for processing, a lengthy amount of time required for lamination, the need for labor to exchange the laminating substance, and the need for conducting evacuation for film formation. In the process of arrangement of styrene spheres in a solvent, there are problems associated with the necessity to maintain the flatness of the substrate, to control the temperature and the humidity of the preparation atmosphere, and that a time period of days or months is required for the arrangement formation.

SUMMARY OF THE INVENTION

According to an aspect of the present invention, there is provided a process for producing a periodic structure, comprising the steps of:

preparing a working object, a property of which is changed by a photoreaction caused by an exciting energy;

generating a light having a photonic energy of intensity of one fraction of natural number divisions of the exciting energy by each of the light sources of light-source groups arranged regularly in a two-dimensional arrangement; and concentrating the light emitted from the light source group at each of light-concentrating points arranged at regular intervals in the working object to cause the photoreaction at and around the light-concentrating point to form a periodic structure comprising regions, each of which has a changed property in the working object.

The photoreaction is preferably a multiphoton absorption reaction.

The lights from the light source group to the working object are preferably introduced through a light-condensing optical system.

The lights from the light source group are preferably coherent lights, and are preferably interfere with each other in the working object to make the lights concentrated.

The lights from the light source group are preferably generated by a single light-generating source.

The light source group is preferably comprised of a single light-generating source and a mask having fine pores arranged periodically in one plane, and the light from the light-generating source is preferably introduced to one face of the mask and emitted from the other face thereof.

The light source group is preferably comprised of a single light-generating source and a microlens array comprising microlenses arranged periodically in one plane, and the light from the light-generating source is preferably introduced to one face of the microlens array and emitted from the other face thereof.

The light source group is preferably comprised of a single light-generating source and an optical fiber bundle of regularly bundled optical fibers, where each fiber has a microlens on one end. The light from the light-generating source is preferably introduced to an end of the optical fiber bundle without the microlens and is emitted from the other end of the fiber bundle.

The periodic structure is preferably formed in three dimensions by changing the relative position of the concentrated points and the working object.

BEST MODE FOR CARRYING OUT THE INVENTION

Figure 1:
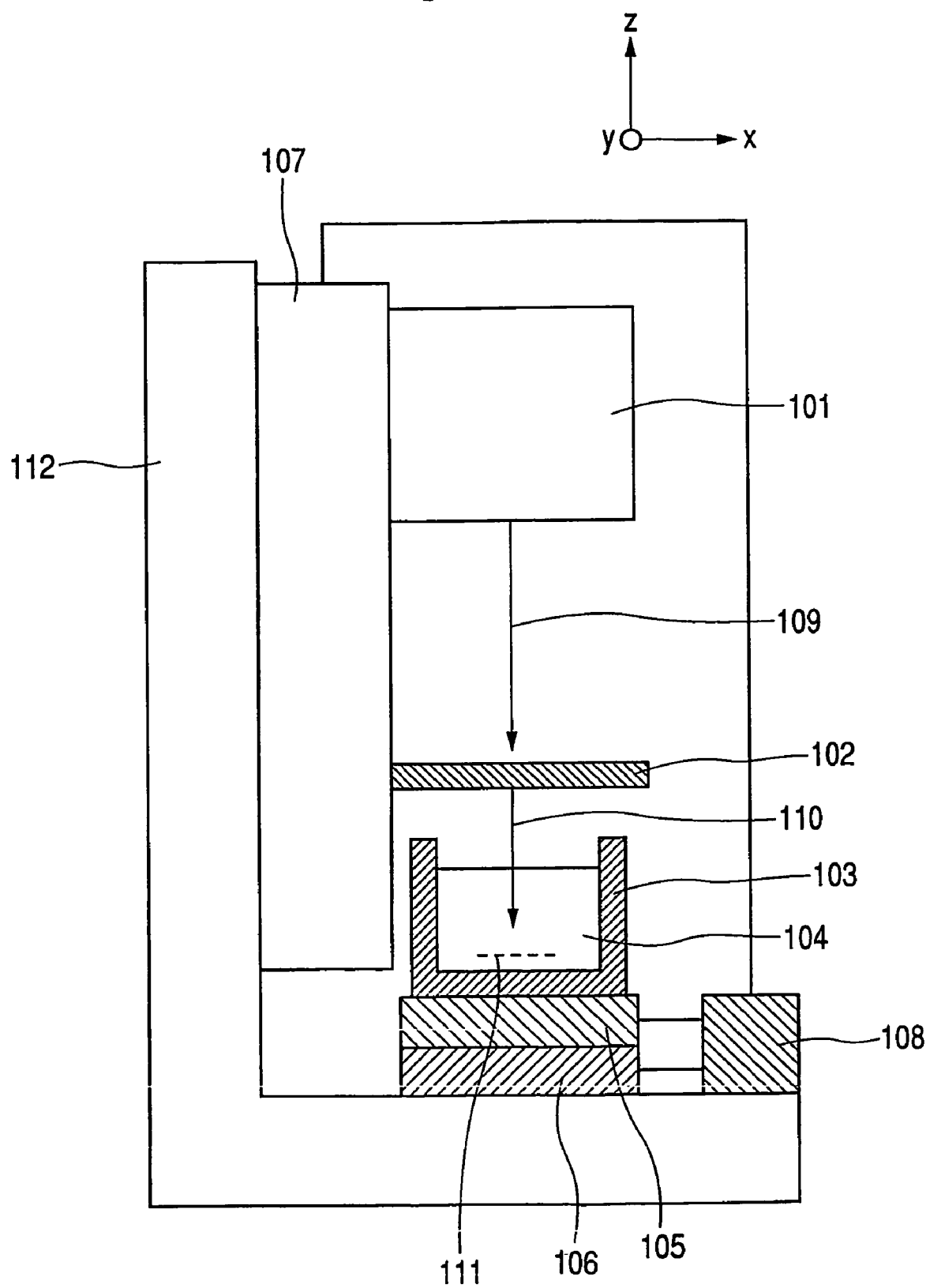
FIG. 1 illustrates the apparatus for producing a fine periodical structure of Example 1 of the present invention.

When irradiated with a light beam, a photosetting resin or a resist, such as an epoxy resin and a urethane-acrylate resin, undergoes or does not undergo a curing reaction locally corresponding to the distribution of the light intensity of the projected light. In a photosetting resin, the portion irradiated with light of an intensity higher than the threshold of the reaction reacts to become cured, whereas the portion irradiated with the light of a lower intensity is not cured and remains in the liquid state. Removal of the uncured liquid-state resin by washing leaves a cured resin portion constituted of a fine periodic structure having a refractive index period of an order of a light wavelength, namely on the order several hundred nanometers. The working object to be processed in the present invention comprises a substance the property of which, such as the refractive index, changes in view of the absorption of the optical energy sufficient for causing a reaction for the change to occur, namely a threshold energy or more (hereinafter, the necessary threshold energy is referred to simply as an "exciting energy").

The terms in the present invention are defined as below:

"Unit light" is a light, which is emitted from each of the light sources constituting one of the light source groups arranged in a two-dimensional regular period, and has the photonic energy of one of N fractions (N: a natural number, hereinafter referred to as "1/N-photonic energy") of the above-defined exciting energy.

"Unit light source" is a source, which emits the unit light.

"Unit light group" is a group of the unit lights and has the exciting energy as a whole. "Unit light source group" is a group of the unit light sources, which emit a unit light group as a whole. The unit light source group is therefore implied by the above-mentioned light source group arranged in a two-dimensional regular period.

"Light-concentrating point" is a point where the unit lights consisting of the unit light group are focused in the working object.

"Exciting light" is a unit light group concentrated at one light-concentrating point and having the exciting energy.

"Unit light-concentrating means" is a means for concentrating the unit lights consisting of the unit light group at one light-concentrating point into the exciting light.

"Exciting light-generating means" is a combination of the unit light source group and the unit light-concentrating means.

The present invention is practiced as described below.

The exciting light-generating means and a working object are placed so as to bring the light-concentrating point at a prescribed position in the working object, and lights of the unit light group are introduced into the working object. The exciting light causes a reaction in a region at and around the light-concentrating point to change the property in the region. For example, plural parallel laser beams employed as the unit light group are introduced through a convex lens as the unit light-concentrating means into the working object to be focused at the focal point of the convex lens. Thereby, a reaction is caused at and around the focal point. The focused light, which is capable of causing a reaction, may be the exciting light, and the focal point may be the light-concentrating point of the present invention.

In the present invention, "convergent light" signifies the light, which has the cross-sectional area of the projected light at the plane vertical to the light propagation direction (hereinafter referred to as an "optical axis"), decreases gradually along the light propagation direction to a minimum at a certain point and then increases gradually with the light propagation. An example is a parallel light beam converged by passage through a convex lens. In the present invention, the term "convergent light" signifies the light before focusing at the light-concentrating point. A group of the convergent light emitted from plural unit light groups is called a "convergent light group". When parallel light is converged and introduced into an object, and causes a photoreaction at the center of the minimized area of the converged light, the center is the light-concentrating point in the present invention.

On the other hand, in the present invention, "divergent light" signifies the light, which has the cross-sectional area of the projected light at the plane vertical to the optical axis, increases gradually along the light propagation direction. Examples are parallel light beams after passage through a concave lens; parallel light beams diverging after focusing by a convex lens; and light emitted from a point light source. When two coherent divergent lights are superposed spatially, the divergent lights interfere with each other to result in a periodic distribution of the light intensity. If each of the lights at anti-nodes of the interference fringe has an intensity equal to or higher than the exciting energy, then the light may be the exciting light in the present invention, and a portion at which the antinode exists may be the light-concentrating point of the present invention. The light is called the "anti-node light" in the context of the present invention.

The regular arrangement of the light-concentrating points within the working object is called a "light-concentrating point array". A fine periodic structure having a two-dimensional regular period can be formed at an intended position in a working object by driving the exciting light-generating means and/or the working object in a controlled manner so as to bring the light-concentrating point array to the intended position in the working object. For example, the controlled-driving means moves a working object supported by a piezo element or the like and by driving the piezo element electrically with the other parts fixed.

In the present invention, the term "a unit-light source group array" signifies an array of the unit light source groups serving as the light source of the array of the unit light groups focusing on the light-concentrating point array.

The term "an exciting light array" signifies an array of the exciting light at the light-concentrating point array.

The term "a unit light-concentrating means array" signifies an array of the means for concentrating the light emitted from the unit light source group array to form the exciting light array.

The combination of the unit-light source group array and the unit light-concentrating means array constitutes an "exciting light array-forming means".

The exciting light array-forming means enables formation of the light-concentrating point array in one step. In an embodiment of the present invention, a fine periodic structure is produced by concentrating an array of the unit light groups emitted from a unit-light source group array through a unit light-concentrating means array on a light-concentrating point array to cause a photoreaction by the formed exciting light array.

In the case where the unit-light group is passed through a unit light-concentrating means and the transmitted light is convergent, the respective terms of a unit-light group, exciting light, a unit light-concentrating means, an exciting light-generating means, a unit-light source group array, an exciting light array, a unit light-concentrating means array, and an exciting light array-forming means are referred to respectively as "a convergent-light source", "focused light", "a light-converging means", "a focused light-generating means", "convergent light source array", "a focused light array", "a converging means array", and "a focused light array-forming means".

On the other hand, in the case where the unit-light group is constituted of at least one of divergent coherent lights, the respective terms of a unit-light group, exciting light, a unit light-concentrating means, an exciting light-generating means, a unit-light source group array, an exciting light array, a unit light-concentrating means array, and an exciting light array-forming means are referred to respectively as "a divergent-light source", "antinode light", "a light-diverging means", "a divergent light generating means", "divergent light source array", "an antinode light pattern", "a diverging means array", and "a divergent light array-forming means".

In the case where the unit-light group is passed through a unit light-concentrating means and the transmitted light is convergent, in one embodiment of the present invention, a fine periodic structure is produced by converging the light beams from convergent-light sources through a light-converging means array and focusing the converged light on a focus point array as the light-concentrating point array to cause a photoreaction by the obtained focused light array.

In another embodiment of the present invention, a working object is processed by introducing thereto divergent coherent light. In this embodiment, a divergent-light source array and a diverging means array are arranged to bring an antinode light pattern to the intended position in the working object, and plural divergent lights are introduced through the diverging means array into the working object to generate the antinode light pattern. Thereby, a reaction is caused at and around the respective antinode centers to form an array of the regions having the changed property corresponding to the pattern. The antinode light pattern gives a larger number of light-concentrating points from the same number of unit-light sources than the focused light array, producing a fine periodic structure more efficiently.

A three-dimensional fine periodic structure can be prepared in a working object through the following steps: forming an exciting light array by use of an exciting light array forming means to cause a photoreaction as a first processing step, and conducting, after shifting the relative position of the working object and the light-concentrating point array, a second processing step in the same manner as the first process step; or conducting the processing with continuous shifting of the relative position of the working object to the light-concentrating point array in the working object. In the present invention, the process for obtaining a fine three-dimensional periodic structure in which the relative position of the exciting light array forming means of the present invention and the working object is shifted during the processing is simply called "a three-dimensional process".

One unit light having an energy of 1/N-photonic energy equal to the exciting energy (i.e., N=1) is capable of causing a reaction at a light-projected small region in the working object by itself as an exciting light without combining another unit light into a unit-light group, so that the unit light is capable of conducting fine processing locally with the aid of a simply structured exciting light-generating means consisting of a source of the unit light not constituting any unit-light source group and a unit light-concentrating means corresponding to the source. For example, in the case where a convergent-light source consists of a single unit-light source, the convergent light from the unit-light source can be considered as the unit light having the exciting energy on the basis of the definitions of the terms, and is therefore capable of causing the reactions as the focused light by itself. Thereby, the fine processing as mentioned above can be conducted in the interior of the working object, provided that the fine controlled driving of such a simply structured focused light generating means consisting of the focused-light source and the focusing means can be conducted.

A working object to be processed by a high-order nonlinear optical process, such as a two-photon process, requires a much higher energy in the working object for a remarkable result. For example, in a working object requiring twice the exciting energy for a one-photon process through the entire process, the irradiation of a unit-light group constituted of N unit light beams each having the 1/N-photonic energy, which is useful in a one-photon process, will not cause the reaction. In this working object, the reaction is caused by receiving twice the energy in total. In other word, by the two-photon process, the reaction can be caused in a range smaller than that of the light-concentrating point area where the reaction is caused by a one-photon photoreaction. This enables finer local processing of the working object.

The apparatus for producing the fine periodic structure of the present invention may be equipped with a temperature-control mechanism for controlling the temperature of the working object before, during, and after the processing. By controlling the temperature of the working object by the temperature-controlling mechanism, the processing can be conducted with high precision without the influence of the environmental conditions, such as temperature.

As described above, not only a two-dimensional structure, but a three-dimensional fine periodic structure constituted of plural units having a unit size of tens to hundreds of nanometers can be produced by a simple constitution of the apparatus in a short period of time with a lesser amount of labor involved. More precise processing can be achieved by utilizing a multiphoton process.

The embodiments of the present invention are described below.

Formation of Light Source Group by Mask

The unit-light source group may be formed from a single light source and a mask having fine pores arranged periodically on one plane. The light projected onto the one face of the mask passes through the fine pores of the mask and is emitted from the pores on the reverse face as plural divergent lights. The emitted plural divergent lights are passed through a convex lens for conversion into parallel lights, namely a unit-light group, and the unit-light group is converged by passing through a second convex lens into an exciting light (the optical system comprised of such two convex lenses for converging the divergent light is called "a converging system"). One of the advantages of this embodiment is that the unit-light source group array can be formed from a smaller number of light sources than the number of the unit-light groups, for example, a single light source.

The spatial distribution of the convergent light or divergent light can be controlled, or the pattern of the light-concentrating point array or the light intensity distribution at a light-concentrating point can be controlled by designing the arrangement pattern of the diameter or the intervals of the fine pores of the mask, or by making them variable. This facilitates the processing and production of the fine structure with a high freedom degree. The mask having a variable size of the pores can be produced from a material stretchable by temperature, a material stretchable by electricity, such as by a piezo element, or the like.

This embodiment having unit-light source group array having a light source and a mask has a simplified constitution of the exciting light generating means or the exciting light array generating means. By this embodiment, the three-dimensional process is facilitated. The constitution can be simplified further by using a convex lens in the converging system, which has a size for covering the pattern of the mask.

The unit-light source group may be constituted without employing the converging system to form a light-concentrating point array by the interference of plural divergent lights emitted from the fine pores.

Light Source Group with Lens Array

The exciting light array-forming means of the present invention may be a focused-light array-forming means constituted of a light source and a fine lens array module having fine lenses arranged periodically. Examples of the fine lens array module include a microlens array module comprised of microlenses fixed by a resin by use of a mold and a fine spherical lens array module comprised of microspherical lenses arranged on a glass substrate. The lens array serves as the converging means array. The light from a light source projected onto one face of the fine lens array module passes through the microlenses and is emitted from the fine pores on the other face as convergent lights to be focused at the light-concentrating points inside the working object. Since the microlenses are arranged two-dimensionally at regular intervals, the light-concentrating points are also arranged two-dimensionally and periodically to form a light-concentrating point array. The focused light array-forming means and/or the working object are driven in a controlled manner to bring the light-concentrating point array to a prescribed position in the working object, whereby a fine periodic structure can be produced at the prescribed positions in one step inside the working object. This simple and durable structure facilitates the positioning by driving a focusing light array forming means in the three-dimensional process.

Light Source Group with Optical Fiber

A focused-light array-forming means is constructed from a light source. An optical fiber bundle is constituted of optical fibers bundled regularly and having a micro convex lens at one end of the respective optical fibers. The micro convex lenses are arranged regularly at the end of the fiber bundle. The positions and intervals of the light-concentrating points inside the working object can be controlled by the regularity of the arrangement. In an example of the optical fiber arrangement, an optical fiber bundle is constituted from six optical fibers having a micro convex lens with the same diameter as the optical fiber at one end of the respective fibers and another optical fiber with the same diameter, but having no micro convex lens surrounded by the above six optical fibers, and the peripheries of all of the micro convex lenses are in contact with the end of the central fiber. A light, such as parallel light of a laser beam introduced to the ends of the optical fibers having no micro convex lens, is emitted as convergent light from the micro convex lenses at the opposite ends. The emitted convergent light is focused respectively in the working object to form a light-concentrating point array corresponding to the micro lens array. The use of optical fiber bundle as the exciting array-forming means simplifies the constitution. Further, the mechanical flexibility of the optical fiber provides a higher degree of freedom in positioning of the light-concentrating point array. When the light beams focused on the light-concentrating points have respectively the exciting energy, the light-concentrating points are the exciting light spot in the present invention, and the array of the light beams is a focused light array. In this case, the light transmitted through one of the optical fibers having a micro convex lens has an exciting energy. Thus, by arranging optical fibers for transmitting a unit light group composed of one or more unit light beams, a focused-light array-forming means can be constituted readily without employing a complicated unit light-concentrating means unit light-concentrating means array to obtain an intended light-concentrating point array.

As described above, the converging system, the fine lens array module and the micro convex lenses generate convergent lights, respectively. Here, a term "light-condensing optical system" means a lens or lens group, which generates convergent lights, such as the converging system, the fine lens array module and the micro convex lenses. Microlens array module 102 and microlens 303 in Examples 1 and 2 described later, respectively, exemplify the light-condensing optical system. A light-condensing optical system therefore may be comprised in a unit light-concentrating means or a light-concentrating means array.

The light introduced to the optical fiber having no micro convex lens at one end is emitted from the other end of the fiber as divergent light. With a micro convex lens having a short focal length, the light is converged and focused once and is then allowed to propagate as divergent light. Therefore, the emitted divergent light can be controlled by selecting the focal length of the micro lenses. In this manner, a divergent light group can be generated from the optical fiber bundle. Therefore, in this embodiment, the light-concentrating point array can be an array constituted of focused lights and can also be constituted of an antinode light pattern. Thus, by utilizing the aforementioned advantage of the focused light array-forming means comprised of the fiber bundle, the position, density and the like of the antinode light pattern can be controlled.

Fine periodic structures having different basic patterns of light-concentrating point arrays can readily be produced by providing an optical switch for at least one fiber of the optical fiber bundle. For example, in the case where an optical fiber bundle is constituted such that the centers of the three microlenses are arranged in a triangular lattice two-dimensionally, and an optical switch is provided for each of the optical fibers, the arrangement of the light-concentrating points can be selected from one point, two points in different directions, and three points in the triangle. The optical switch is exemplified by an AO (acousto-optic) element.

EXAMPLES

Specific examples of the present invention are discussed below with reference to the drawings. Throughout the drawings, the corresponding members are indicated by the same symbols.

Example 1

Figure 2:
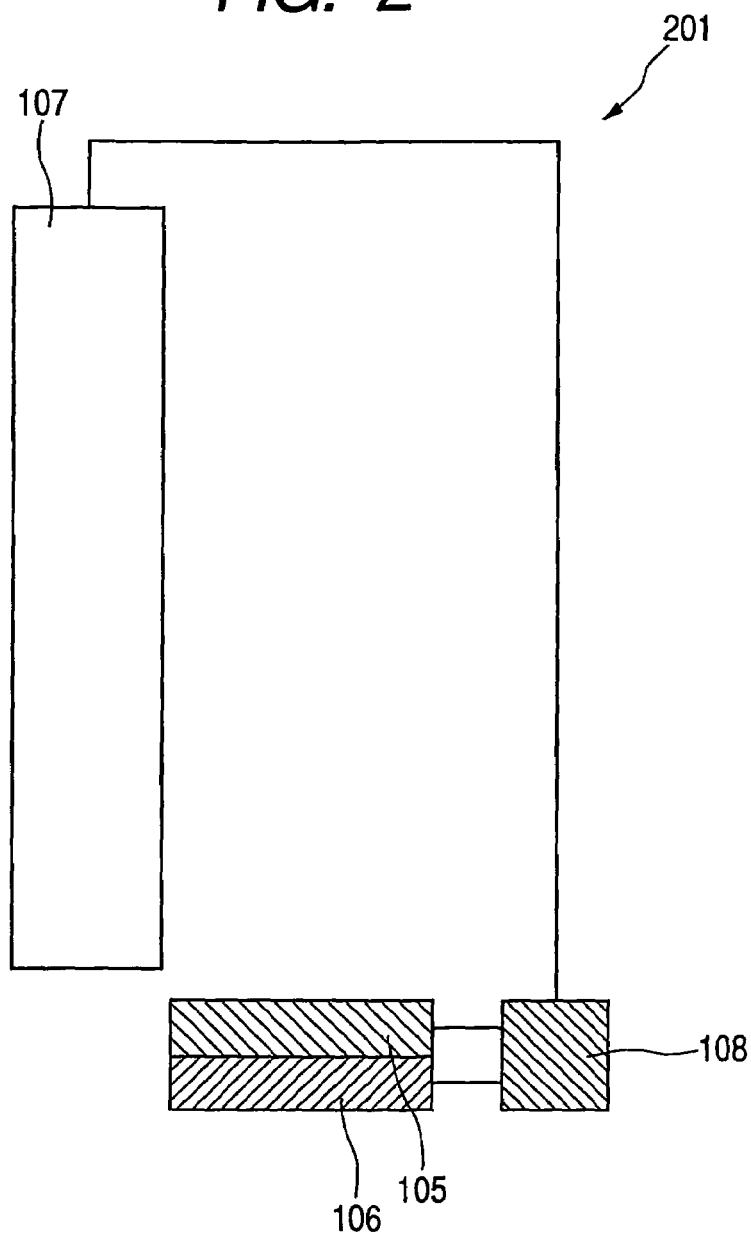
FIG. 2 illustrates the drive-controlling device employed in the apparatus for producing a fine periodical structure of Example 1 of the present invention.

FIG. 1 shows a constitution of an apparatus for producing a fine periodic structure employed in the present invention. In FIG. 1, the x, y, and z directions are defined by the coordinate axes. The numeral 101 indicates a dye laser, which emits a laser beam 109, parallel light, of a wavelength of 700 nm and a beam diameter of about 1 mm. The numeral 102 indicates a microlens array module having a 100×100 square lattice matrix of microlenses of about 20 μm diameter. Dye laser 101 and microlens array 102 are supported by support 107 on fixed table 112. Dye laser 101 and microlens array module 102 constitute a focused light array-forming means. The numeral 103 indicates a glass cell for holding photosetting resin 104, a working object, which is to be solidified by polymerization by application of an exciting energy corresponding to the light of a wavelength of about 350 nm. The glass cell is set on fine x-y-z adjustment mechanism 105. Coarse x-y-z adjustment mechanism 106, having a built-in motor, and fine x-y-z adjustment mechanism 105, having a built-in PZT element, drive the glass cell 103 coarsely and finely in the x, y, and z directions and adjust the relative position of glass cell 103 to the focused light array-forming means. Both adjustment mechanisms are controlled by control device 108 according to the information as to the position on support 107. The PZT element enables a fine adjustment in a range of several nanometers to several micrometers, and the motor enables a coarse adjustment in the range of several micrometers to several millimeters. Support 107, fine x-y-z adjustment mechanism 105, coarse x-y-z adjustment mechanism 106, and control device 108 constitute a drive-controlling assembly. FIG. 2 shows the constitution of drive-controlling assembly 201.

Laser beam 109 is converted to convergent light group 110 by the passage through the microlens array. The position of the glass cell 103 is adjusted preliminarily by drive-controlling assembly 201, such that the convergent light group introduced into photosetting resin 104 forms focused light array 111 on the interface between photosetting resin 104 and the bottom face of glass cell 103, and the laser beam is projected thereto. Consequently, the photosetting resin is solidified by polymerization by a two-photon process at and around the light-concentrating points. In this example, convergent light group 110 is projected into the photosetting resin for 5 seconds to form a fine periodic structure of a two-dimensional matrix having periods of about 20 μm in x and y directions and the solidification regions of 200 nm. The diameter of the region of the formed fine period structure is about 1 mm corresponding to the laser beam diameter of about 1 mm. After this process, the glass cell is moved by 10 μm in the x direction by drive-controlling assembly 201, and convergent light group 110 is again projected. Thereby, a fine periodic structure of a two-dimensional matrix having periods of about 10 μm in the x direction and about 20 μm in the y direction and the solidification region of 200 nm is formed. The size of the solidification region can be arbitrarily controlled by controlling the convergent light group, the projection time, and other factors. In another processing operation, the convergent light group is projected into photosetting resin 104 with glass cell 103 being driven, immediately after the start of the processing, by drive-controlling assembly 201 in a circular motion of 5 μm diameter in the x-y plane and in a negative z direction. Thereby, a fine periodic structure can be obtained in which solidified regions in a spiral in the z direction are arranged in the x-y plane in the resin. As described above, three-dimensional fine periodic structure can readily be obtained by the process for producing a fine periodic structure of the present invention using the apparatus structured as described in this Example.

Example 2

Figure 3:
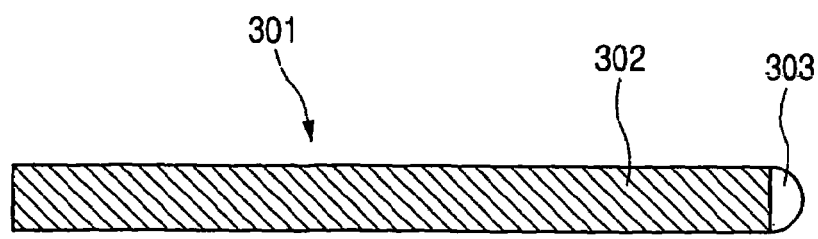
FIG. 3 illustrates the optical fiber employed in the apparatus for producing a fine periodical structure of Example 2 of the present invention.
Figure 4:
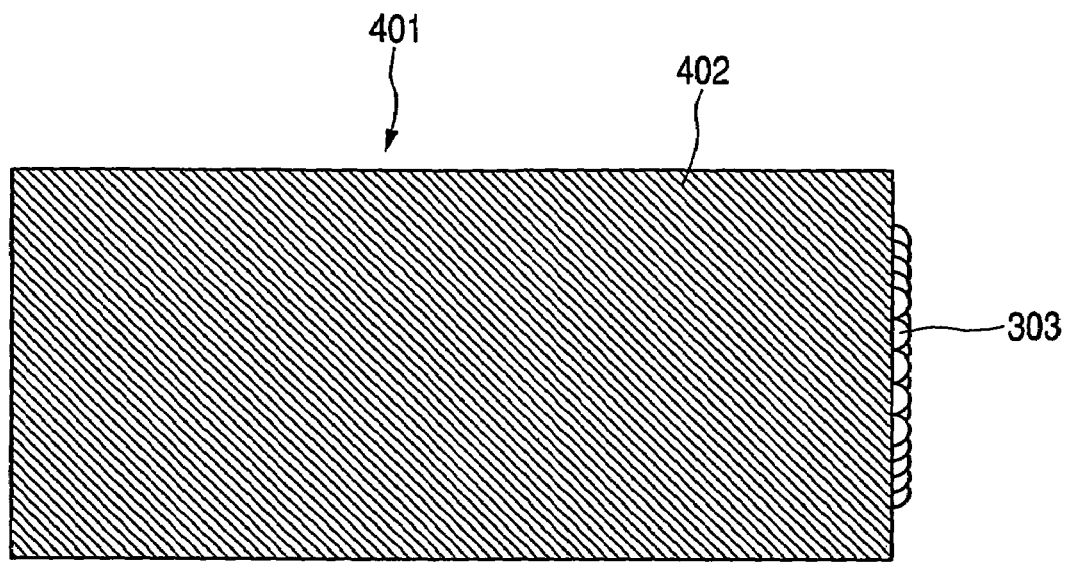
FIG. 4 illustrates the optical fiber bundle employed in the apparatus for producing a fine periodical structure of Example 2 of the present invention.
Figure 5:
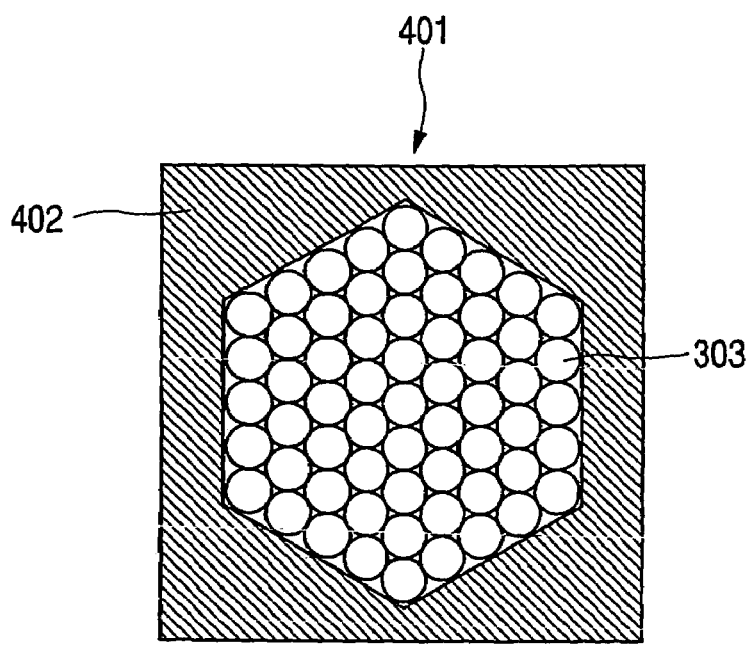
FIG. 5 illustrates the arrangement in the optical fiber bundle employed in the apparatus for producing a fine periodical structure of Example 2 of the present invention.
Figure 6:
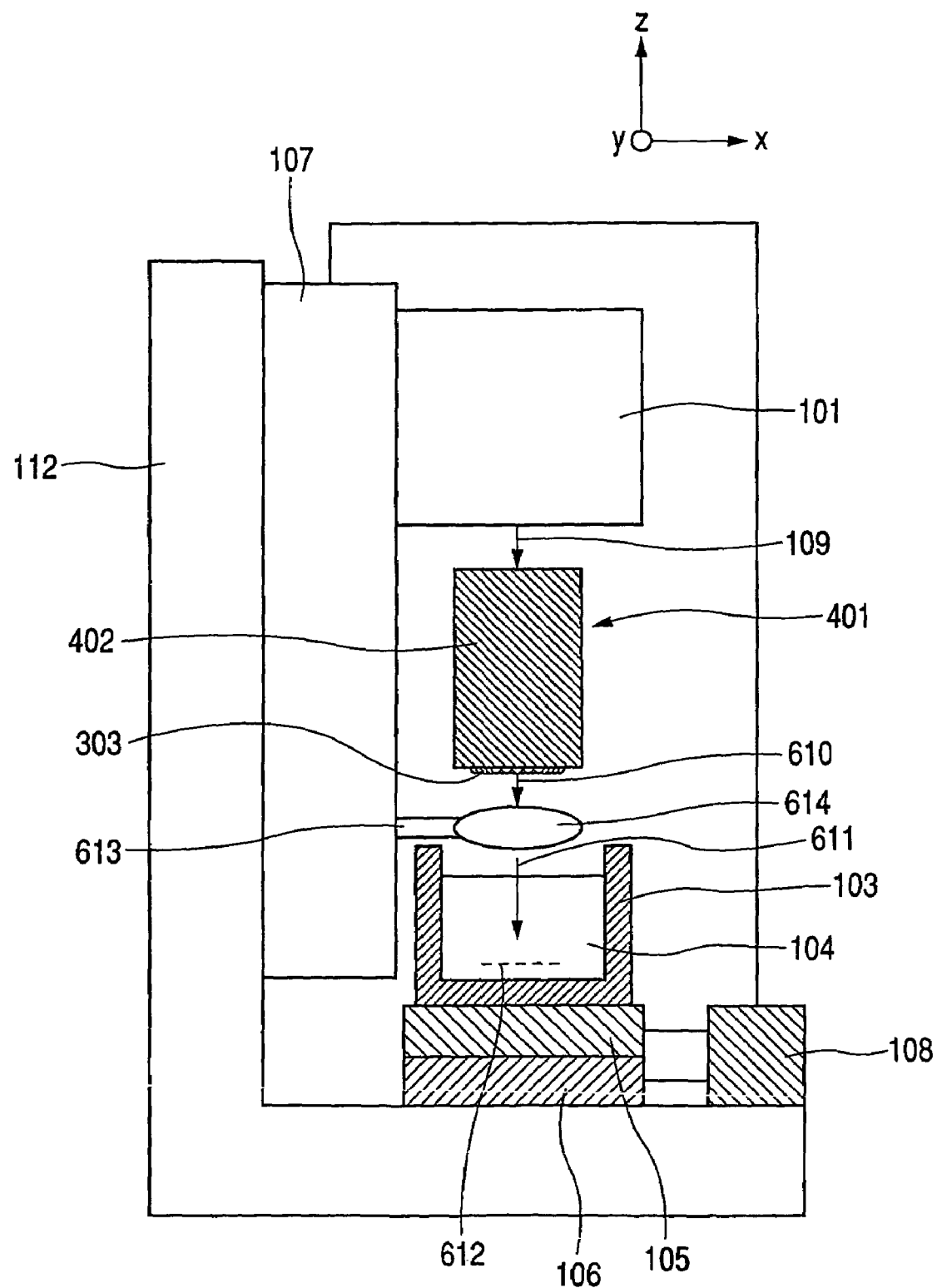
FIG. 6 illustrates the apparatus for producing a fine periodical structure of Example 2 of the present invention.

FIG. 6 shows a constitution of the fine periodic structure of the present invention, employing an optical fiber bundle as the convergent light array-forming means. The x, y, and z directions are defined by the coordinate in FIG. 6. The numeral 401 in FIG. 6 indicates the optical fiber bundle 401 shown as in FIGS. 4 and 5. The optical fiber bundle is held in optical fiber holder 402 having a hexagonal hole the central axes in longitudinal direction of which holder and hole coincide with each other, and is constituted of sixty-one optical fibers 301 shown in FIG. 3, which are placed in parallel in the hole of the holder and arranged in a triangular lattice in the cross-section perpendicular to the axis of holder 402. The optical fiber 301 is constituted of fiber portion 302 having a diameter of about 100 μm and a length of about 5 cm, and microlens 303. Sixty-one microlenses 303 are placed to have the lens ends uniformly flat at the end face perpendicular to the long axis of holder 402 as shown in FIG. 4 and are arranged in a triangular lattice as shown in FIG. 5. Optical fiber bundle 401 converts laser beam 109 to convergent light group 610 emitted from microlenses 303. Convex lens 614 held by lens holder 613 supported by support 107 adjusts the directions of each of the convergent light beams of convergent light group 610 to decrease the distance between the light-concentrating points in light-concentrating point array 612. The direction-adjusted beams of the convergent light group are emitted from convex lens 614 as modified convergent light flux 611. Dye laser 101, optical fiber bundle 401, and convex lens 614 constitute a focused-light array-forming means.

The position of glass cell 103 is adjusted preliminarily by drive-controlling assembly 201 such that convergent light group 611 introduced into photosetting resin 104 forms focused light array 612 on the interface between the photosetting resin and the bottom face of glass cell 103, and the laser beam is projected thereto. For example, projection of focused light group 611 to the photosetting resin for 5 seconds forms a two-dimensional fine period structure with a period of about 10 μm and a solidified region of about 200 nm. Convex lens 614 is effective, for example, such that the light-concentrating point intervals of about 100 μm without convex lens 614 is decreased to about 20 μm by use of convex lens 614 and passage of the focused light group through convex lens 614. After this first processing step, the glass cell is moved in the x direction by 10 μm and fixed by drive-controlling assembly 201. Then, convergent light group 611 is projected to the photosetting resin. Thereby, a two-dimensional fine periodic structure is obtained, which has a period of about 10 μm in the x direction, a period of about 20 μm in the y direction, and a solidified region of about 200 nm. The size of the solidified region can be varied arbitrarily by adjusting the intensity of the convergent light, the irradiation time, and the like conditions. A fine periodic structure having solidified regions in a spiral in the z direction arranged in the x-y plane in the resin can readily be prepared in the same manner as in Example 1. As described above, a three-dimensional periodic structure can readily be prepared with the apparatus structured as described in this Example.

Example 3

Figure 10:
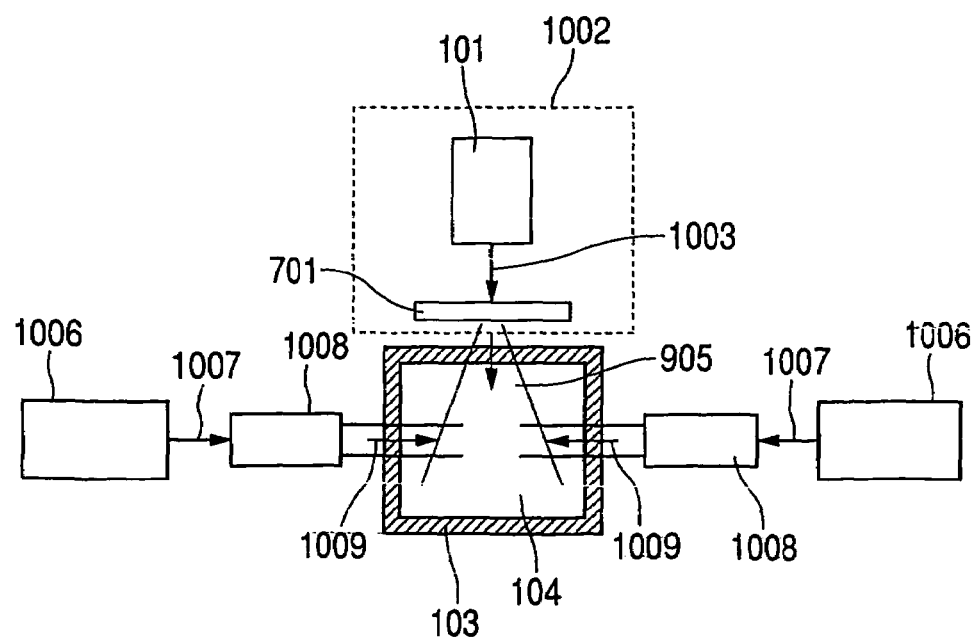
FIG. 10 illustrates the apparatus for producing a fine periodical structure of Example 3 of the present invention.

This example shows a constitution employing a light source and a mask as the divergent light-generating means. FIG. 10 shows the constitution of the apparatus for producing a fine periodic structure employed in this Example. This apparatus has divergent light-generating means 1002 constituted of HeCd laser 101 as the light source for emitting a light of a wavelength of 355 nm and spot diameter of about 2 mm, and mask 701 as the light diverging means. Divergent light group 905 generated by divergent light-generating means 1002 is introduced into working object 104 contained in glass cell 103.

Figure 7:
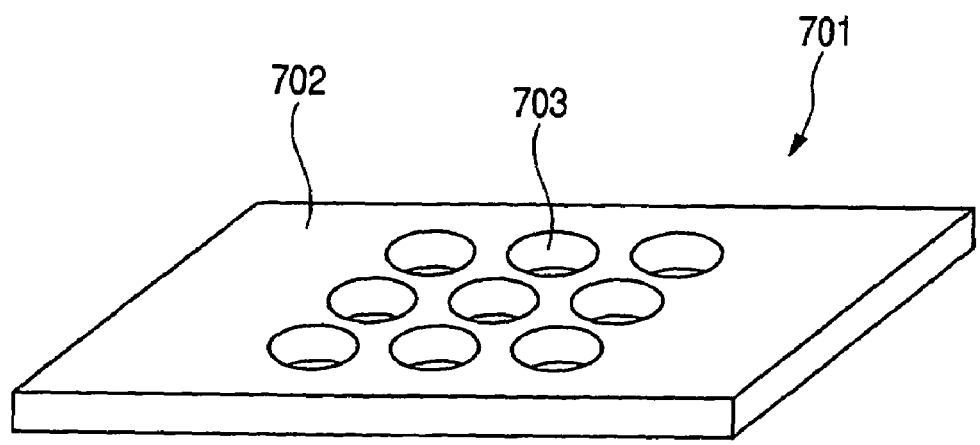
FIG. 7 illustrates the mask employed in Example 3 of the present invention.
Figure 8:
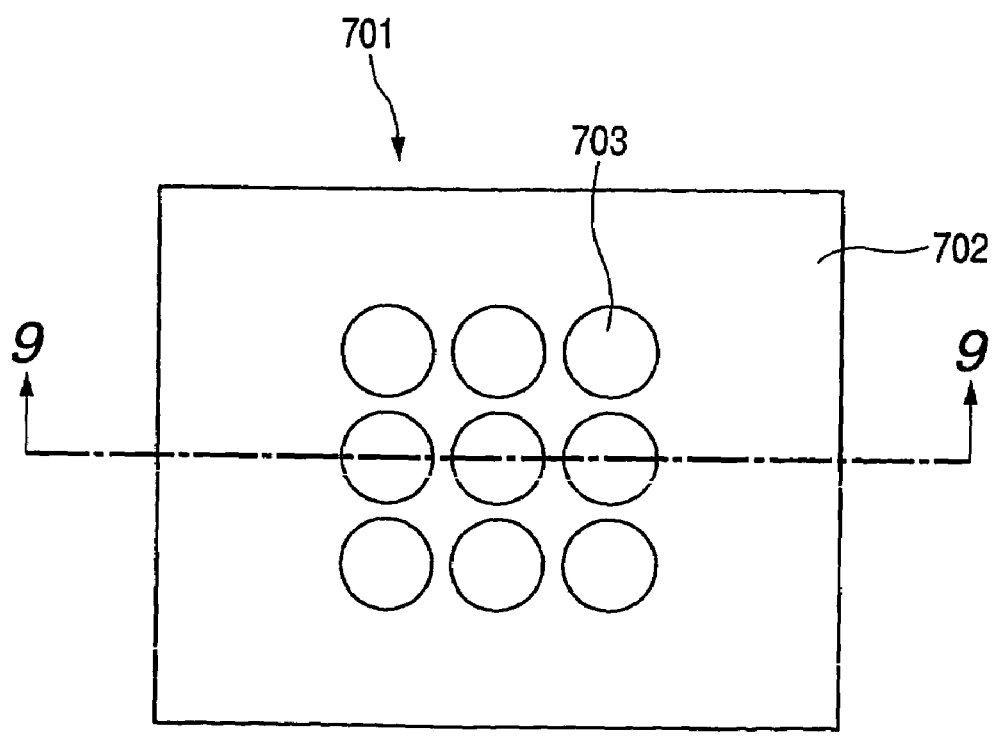
FIG. 8 illustrates the mask employed in Example 3 of the present invention.
Figure 9:
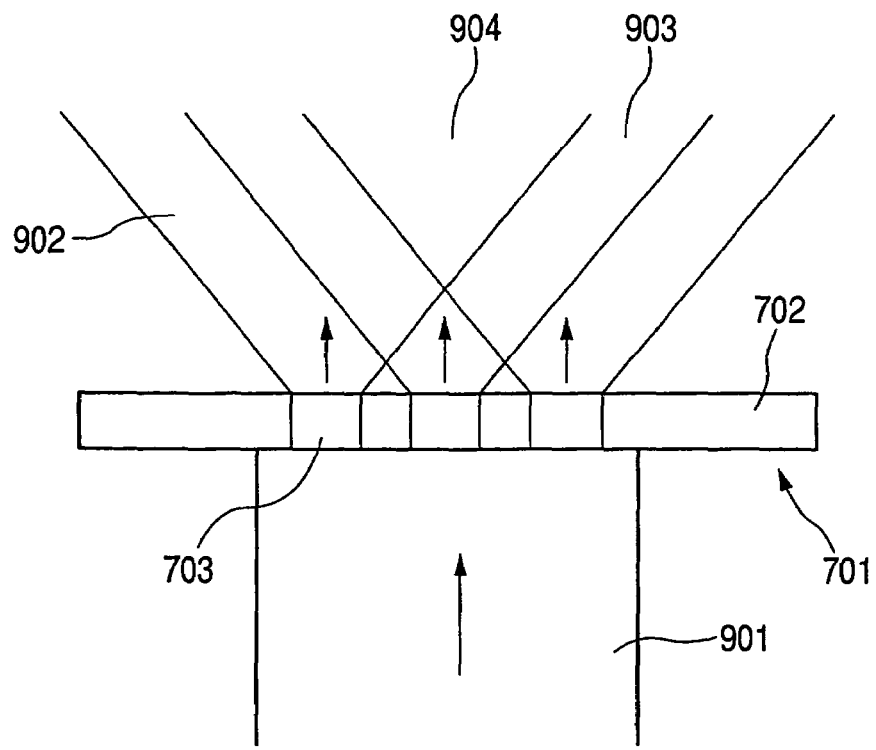
FIG. 9 illustrates generation of divergent light beams by the mask in Example 3.

FIG. 7 shows mask 701 employed in this example. This mask 701 is made of Si substrate 702 of a thickness of about 200 μm in which fine pores 703 are bored at intervals of 10 μm in a 3×3 matrix. FIG. 8 is a plan view of the mask shown in FIG. 7. FIG. 9 is a sectional view taken along line 9-9 in FIG. 8. As shown in FIG. 9, parallel light introduced to one face of mask 701 passes through nine fine pores 703 and is emitted from the other face as nine divergent lights 902 diffracted by the fine pores. The nine divergent lights have spatial overlaps 903,904. The emitted light beams consisting of these divergent lights are referred to as a divergent light group.

As working object 104, an epoxy type photosetting resin is used, which has an absorption band region in the wavelength region longer than the wavelength of an HeCd laser for polymerization.

Laser light beam 1003 emitted from HeCd laser 101 is directed to one face of mask 701, and divergent light group 905 is allowed to be emitted from the other face. This divergent light group 905 is introduced into photosetting resin 104. The beams of divergent light group 905, which have the same wavelength and three-dimensional overlap, interfere in photosetting resin 104 to form an interference pattern in the light intensity distribution. In the photosetting resin, portions where the light energy intensity is not lower than that for initiation of the polymerization are cured, and the rest of the resin remains uncured in a liquid state. Removal of the remaining liquid resin by washing yields a fine periodic structure formed from cured photosetting resin 104 corresponding to the light intensity distribution.

In this example, for producing a three-dimensional structure, two HeCd lasers 1006 for a wavelength of 355 nm are placed at the lateral sides of glass cell 103 in an opposed arrangement, as shown in FIG. 10. Light beams 1007 of 2 mm in spot diameter emitted from HeCd lasers 1006 are expanded by beam expanders 1008 to beams 1009 of spot diameters of about 2 cm. Beams 1009 are projected into photosetting resin 104 in parallel and in an opposite direction to each and interfere with each other to form a standing wave in a one-dimensional direction in the resin. Similar to divergent light group 905, portions of the resin are cured where the light energy intensity is not lower than that for the initiation of the polymerization, and the rest of the resin remains uncured in a liquid state. Removal of the remaining liquid resin by washing yields a fine periodic structure constituted of cured photosetting resin 104 corresponding to the light intensity distribution.

A three-dimensional fine periodic structure can be produced in a short period of time with a high level of precision using the apparatus having a structure as described in this Example.

Example 4

In this example, the divergent light-generating means is comprised of a light source and an optical fiber bundle comprising at least one optical fiber having a fine lens at the end thereof.

Figure 11:
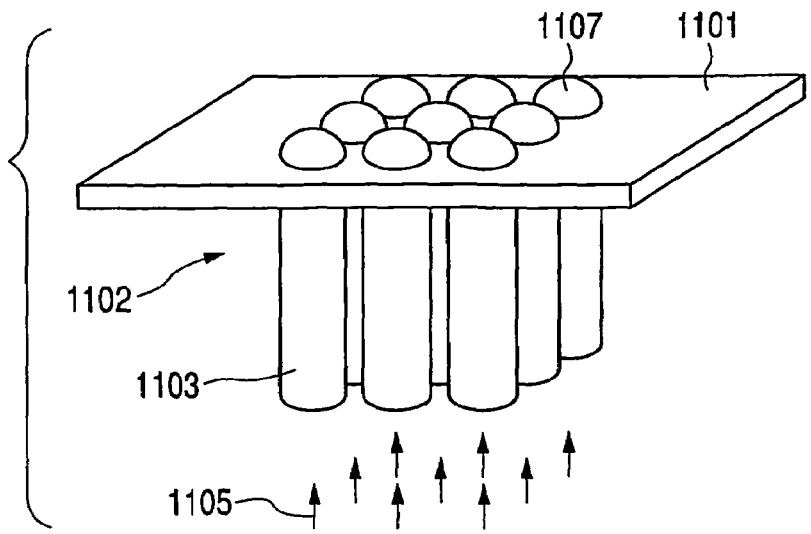
FIG. 11 illustrates introduction of light into the optical fiber bundle in Example 4 of the present invention.

FIG. 11 shows the introduction of incident light beam 1105 into fiber bundle 1102 of this Example constituted of nine optical fibers 1103 held by fiber holder 1101. Microlenses 1107 are provided at the ends of the optical fibers 1103 at the divergent light emission side. The optical fibers have a diameter of 50 μm and have a microlens formed by fusion of the tip by laser irradiation at the respective ends. Fiber holder 1101 is made of an Si substrate, having fine pores in a two-dimensional periodic arrangement formed by photolithography for setting the optical fibers.

Figure 12:
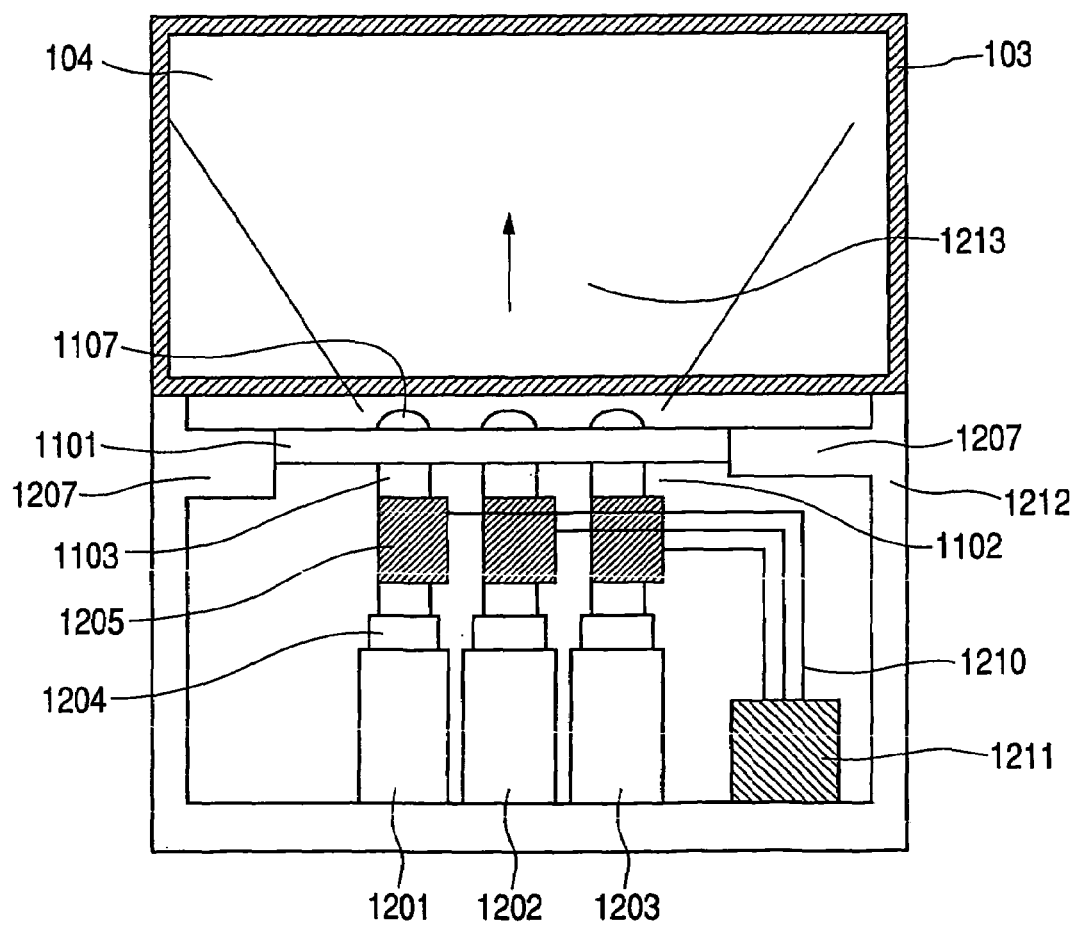
FIG. 12 illustrates the apparatus for producing a fine periodical structure of Example 4 of the present invention.

FIG. 12 shows an apparatus for producing a fine periodic structure employing a divergent light-generating means comprised of a light source and optical fiber bundle 1102 shown in FIG. 11. The numerals 1201, 1202, and 1203 indicate, respectively, a laser for emitting ultraviolet light of 320, 340, or 360 nm. The three lasers are connected respectively to three of optical fibers 1103 by fiber couplers 1204. Laser beams are introduced to the optical fibers, and divergent light groups 1213 emitted from microlenses 1107 are introduced to photosetting resin 104, a working object, contained in glass cell 103. The numeral 1212 indicates a base of the apparatus. Fiber holder 1101 is supported by a fiber holder-supporting portion of base 1212. Optical fibers 1103 are connected to optical switches 1205. The light passing through optical fiber 1103 can be switched by controlling the optical switches by optical switch driving device 1211 through wiring 1210.

In this example, plural wavelengths of the light beams are employed for introducing light into the respective optical fibers, whereby the interference configuration formed by divergent light beams emitted from microlenses 1107, namely the light intensity distribution, is made to be different from the interference configuration obtained from single wavelength light.

This application claims priority from Japanese Patent Application No. 2003-344412 filed on Oct. 2, 2003, which is hereby herein incorporated by reference.

The invention claimed is:

1. A process for producing a periodic structure, comprising the steps of:
    preparing a working object which changes a property thereof by photoreaction caused by an exciting energy;
    generating a light having a photonic energy of intensity of one fraction of natural number divisions of the exciting energy by each of light sources of light-source groups arranged regularly in two-dimensional arrangement; and
    concentrating the light emitted from light source group at each of light-concentrating points arranged at regular intervals in the working object to cause photoreaction at and around the light-concentrating point to form a periodic structure comprised of regions each of which has a changed property in the working object.

2. The process for producing a periodic structure according to claim 1, wherein the photoreaction is a multiphoton absorption reaction.

3. The process for producing a periodic structure according to claim 1, wherein the lights from the light source group are introduced through a light-condensing optical system to the working object.

4. The process for producing a periodic structure according to claim 1, wherein the lights from the light source group are coherent lights, and the lights from the light source group are interfered with each other in the working object, to make the lights concentrated.

5. The process for producing a periodic structure according to claim 1, wherein the lights from the light source group are generated by a single light-generating source.

6. The process for producing a periodic structure according to claim 1, wherein the light source group is comprised of a single light-generating source and a mask having fine pores arranged periodically in one plane, and the light from the light-generating source is introduced to one face of the mask and emitted from the other face thereof.

7. The process for producing a periodic structure according to claim 1, wherein the light source group is comprised of a single light-generating source and a microlens array comprising microlenses arranged periodically in one plane, and the light from the light-generating source is introduced to one face of the microlens array and emitted from the other face thereof.

8. The process for producing a periodic structure according to claim 1, wherein the light source group is comprised of a single light-generating source and an optical fiber bundle of optical fibers bundled regularly each of which fibers has a microlens on one end, and the light from the light-generating source is introduced to an end of the optical fiber bundle having no microlens, and emitted from the other end of the fiber bundle.

9. The process for producing a periodic structure according claim 1, wherein the periodic structure is formed in three dimensions by changing the relative position of the light-concentrating points and the working object.

* * * * *

UNITED STATES PATENT AND TRADEMARK OFFICE
CERTIFICATE OF CORRECTION

PATENT NO. : 7,408,692 B2
APPLICATION NO. : 10/573308
DATED : August 5, 2008
INVENTOR(S) : Kohei Okamoto et al.

It is certified that error appears in the above-identified patent and that said Letters Patent is hereby corrected as shown below:

ON THE TITLE PAGE [56] REFERENCES CITED:

OTHER PUBLICATIONS, insert: --V. Mizeikis et al., "Femtosecond Laser Microfabrication of Photonic Crystal Structures by Glass Damaging and Resin Photosolidification," *Proceedings of the 4$^{th}$ Pacific Rim Conference on Lasers and Electro-Optics*, vol. 1, pp. I-302 - I-303 (July 2001).--, and insert --Xuan-Ming Duan et al., "Micron/Nanofabrication of Two and Three Dimensional Structures by Two-Photon Polymerization," *Proceedings of the 2003 Third IEEE Conference on Nanotechnology*, pp. 498-501 (August 2003).--.

COLUMN 2:

Line 10, "are" should be deleted.

COLUMN 3:

Line 15, "order" (second occurrence) should read --order of--.

COLUMN 6:

Line 14, "word," should read --words,--.

COLUMN 7:

Line 64, "unit light-concentrating means" should be deleted.

COLUMN 10:

Line 14, "is" should read --are--.

UNITED STATES PATENT AND TRADEMARK OFFICE
CERTIFICATE OF CORRECTION

PATENT NO.       : 7,408,692 B2
APPLICATION NO.  : 10/573308
DATED            : August 5, 2008
INVENTOR(S)      : Kohei Okamoto et al.

It is certified that error appears in the above-identified patent and that said Letters Patent is hereby corrected as shown below:

COLUMN 12:

Line 14, "light" (second occurrence) should read --a light--.

Signed and Sealed this

Second Day of December, 2008

JON W. DUDAS
*Director of the United States Patent and Trademark Office*